United States Patent [19]

Moore et al.

[11] 4,335,238

[45] Jun. 15, 1982

[54] FLUOROPOLYMER HEXAFLUOROPROPENE, TETRAFLUORETHENE AND 1,1-DIFLUOROETHENE

[75] Inventors: Albert L. Moore; Clare A. Stewart, Jr.; Isadore Swerlick, all of Wilmington, Del.

[73] Assignee: E. I. Du Pont de Nemours and Company, Wilmington, Del.

[21] Appl. No.: 193,375

[22] Filed: Oct. 6, 1980

[51] Int. Cl.³ .............................................. C08F 214/28
[52] U.S. Cl. ................................... 526/254; 526/214; 427/58; 427/117; 428/421; 524/805
[58] Field of Search ...................... 526/254, 253, 255

[56] References Cited

U.S. PATENT DOCUMENTS

| | | | |
|---|---|---|---|
| 2,968,649 | 1/1961 | Pailthorpe et al. | 260/80.5 |
| 3,467,636 | 9/1969 | Nersasian | 526/249 X |
| 3,801,552 | 4/1974 | Kometani et al. | 260/80.77 |
| 3,951,913 | 4/1976 | Kometani | 526/249 X |
| 3,962,169 | 6/1976 | Arruda et al. | 260/29.6 F |
| 4,027,086 | 5/1977 | LoValvo | 526/79 |
| 4,123,603 | 10/1978 | Stewart | 526/254 |
| 4,141,874 | 2/1979 | Oka et al. | 260/29.6 F |

FOREIGN PATENT DOCUMENTS 844965 2/1977 Belgium .
48-18957 6/1973 Japan .

*Primary Examiner*—C. A. Henderson

[57] ABSTRACT

Terpolymer consisting of 12 to 48% by weight TFE units, 7 to 24% by weight HFP units and 30 to 81% by weight VF$_2$ units, provided that when the content of TFE units is less than 42% by weight, the content of HFP units is less than 15% by weight. Heat-stable films such as polyimide film can be coated with a coating comprising the terpolymer to provide heat-sealable film useful as wire insulation.

3 Claims, 1 Drawing Figure

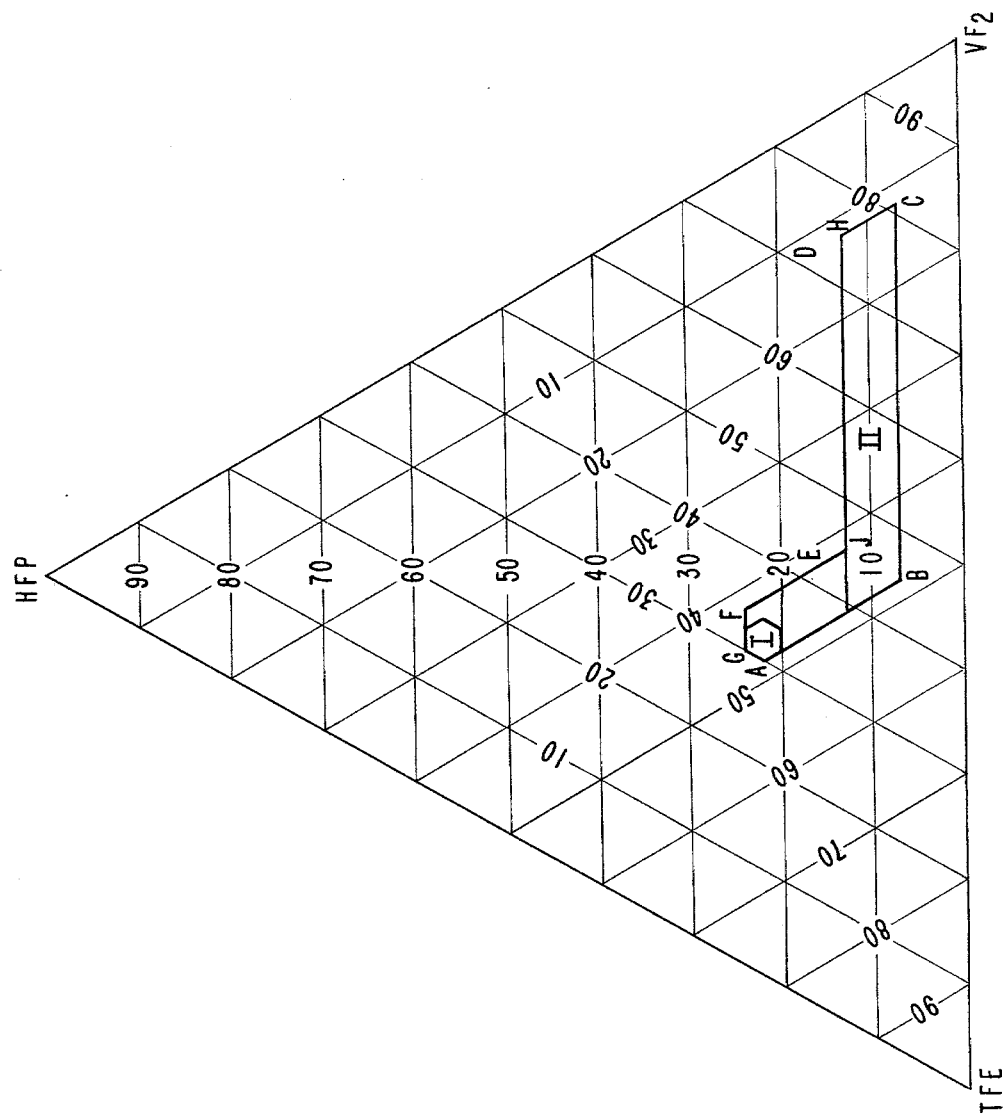

FLUOROPOLYMER HEXAFLUOROPROPENE, TETRAFLUORETHENE AND 1,1-DIFLUOROETHENE

BACKGROUND OF THE INVENTION

This invention concerns improvements in and relating to fluorine-containing polymers, and in particular to terpolymers of tetrafluoroethylene (TFE), hexafluoropropylene (HFP) and vinylidene fluoride (VF$_2$).

Fluorinated polymers such as polytetrafluoroethylene (PTFE), polyhexafluoropropylene (PHFP), polyvinylidene fluoride (PVF$_2$) and copolymers of tetrafluoroethylene and hexafluoropropylene (FEP) are known as heat-sealable coatings for polyimide film in U.S. Pat. No. 3,352,714. Numerous other patents, such as U.S. Pat. No. 3,592,714, also disclose FEP as a heat-sealable coating for polyimide film. However, polyimide film coated with PTFE or FEP requires a temperature for heat-sealing which is too high for some uses, such as insulation over tin-coated copper conductors, because the temperature required for heat sealing damages the tin coating, thereby impairing the solderability of such conductors. Coatings which are more stable than PVF$_2$ are desired, and coatings of PHFP are very tacky.

Other fluorine-containing polymers are known in the art.

U.S. Pat. No. 2,968,649 discloses and claims a terpolymer consisting of 3 to 35% by weight of tetrafluoroethylene units and 97 to 65% by weight of vinylidene fluoride and hexafluoropropene units, in which the vinylidene fluoride and hexafluoropropene units are in a weight ratio in the range of 2.33:1 to 0.667:1.0.

U.S. Pat. No. 3,801,552 discloses a method of producing a fluoroelastomeric terpolymer by polymerization of tetrafluoroethylene, vinylidene fluoride and hexafluoropropene. The composition of the terpolymer falls within the area bounded by the following four mole ratios of tetrafluoroethylene, vinylidene fluoride, and hexafluoropropene: 5:85.7:9.3, 5:59.7:35.3, 30:28:42, and 30:54:16.

U.S. Pat. No. 4,123,603 discloses and claims a terpolymer consisting of 10 to 14% by weight of tetrafluoroethylene, 27 to 31% by weight of hexafluoropropylene and 57–61% by weight of vinylidene fluoride.

U.S. Pat. No. 4,141,874 discloses a copolymer of vinylidene fluoride and at least one other fluorine-containing monomer, said copolymer containing 28 to 92% by mole of the vinylidene fluoride unit and having an intrinsic viscosity of 0.4 to 1.3 at 35° C. in methyl ethyl ketone, said other fluorine-containing monomer being at least one member selected from the group consisting of tetrafluoroethylene, trifluoroethylene, trifluorochloroethylene, trifluoropropene, hexafluoropropene, pentafluoropropene, trifluorobutene, perfluoromethyl perfluorovinyl ether and perfluoroethyl perfluorovinyl ether, which copolymer is prepared by copolymerizing at a first stage vinylidene fluoride and at least one other fluorine-containing monomer in an aqueous medium in the presence of a water-soluble radical polymerization initiator to give a first stage-copolymer having an intrinsic viscosity of 0.01 to 3.0 at 35° C. in methyl ethyl ketone, and further copolymerizing at a second stage vinylidene fluoride and at least one other fluorine-containing monomer in an aqueous medium in the presence of said first stage-copolymer and an oil-soluble radical polymerization initiator to give second stage-copolymer, said elastomeric copolymer comprising 1 to 80% by weight of said first stage-copolymer and 20 to 99% by weight of said second stage copolymer.

Belgian Pat. No. 844,965 discloses a terpolymer consisting of 50 to 85% by weight of tetrafluoroethylene, 5 to 40% by weight of hexafluoropropylene and 10 to 45% by weight of vinylidene fluoride.

Japanese Patent Publication No. 48-18957 discloses a process for preparing fluorine-containing terpolymers containing 10–30% by weight of tetrafluoroethylene and 90–70% by weight of vinylidene fluoride and hexafluoropropene having weight ratio of vinylidene fluoride to hexafluoropropene in the range 1.6:1 to 4:1.

In addition, a fluorine-containing terpolymer has been marketed in the United States by Daikin Kogyo Co., Ltd., Osaka, Japan, in which the composition by weight of tetrafluoroethylene, vinylidene fluoride and hexafluoropropene was about 14:53:33.

However, none of the known fluorine-containing polymers provides a coating for polyimide or other heat-stable polymer films which is capable of being formulated to provide all of the desired characteristics. These characteristics include thermal stability, good heat-sealing characteristics, and antiblocking properties. The heat-seal should be strong not only initially, but should remain strong after extended aging at high temperature, after exposure to boiling water, and after exposure to certain detergents and solvents. The terpolymer should be such that the coated film is antiblocking for coated-side-to-uncoated-side in the case of one-side-coated film, and preferably, is also antiblocking for coated-side-to-coated-side in the case of two-side-coated film.

It is accordingly an object of the present invention to provide terpolymers of TFE, HFP and VF$_2$ which are capable of being formulated to provide the desired thermal stability, heat-sealing and antiblocking characteristics in a heat-sealable coating for polyimide and other heat-stable films.

SUMMARY OF THE INVENTION

Terpolymers of TFE, HFP and VF$_2$ which possess the desired properties have now been made.

Specifically, according to the invention there is now provided a terpolymer consisting of 12 to 48% by weight of polymerized tetrafluoroethylene units, 7 to 24% by weight of polymerized hexafluoropropylene units and 30 to 81% by weight of polymerized vinylidene fluoride units, provided that when the content of tetrafluoroethylene units is less than 42% by weight, the content of hexafluoropropylene units is less than 15% by weight and is preferably less than 13% by weight.

BRIEF DESCRIPTION OF THE DRAWING

The FIGURE is a ternary composition plot, shown in triangular coordinates, of the ranges of the amounts of polymerized units of the terpolymer of the invention.

DETAILED DESCRIPTION OF THE INVENTION

The invention is a terpolymer consisting of 12 to 48% by weight of polymerized TFE units, 7 to 24% by weight of polymerized HFP units and 30 to 81% by weight of polymerized VF$_2$ units, provided that when the content of TFE units is less than 42% by weight, the content of HFP units is less than 15% by weight (the area defined by points A, B, C, D, E, F and G of the FIGURE) and is preferably less than 13% by weight (the area defined by points A, B, C, H, J, F and G of the FIGURE). A more preferred composition is that consisting of 44 to 48% by weight of TFE units, 20 to 24% by weight of HFP units and 30 to 34% by weight of $VF_2$ units (Area I of the FIGURE). Another more preferred composition is that consisting of 12 to 48% by weight of TFE units, 7 to 13% by weight of HFP units and 39 to 81% by weight $VF_2$ units (Area II of the FIGURE). The compositions of Areas I and II are more preferred because they provide the best antiblocking characteristics when the terpolymers are formulated with a particulate material for use as a heat-sealable coating for heat-stable films.

The terpolymers of this invention are prepared by copolymerization of the TFE, HFP and $VF_2$ monomers in an aqueous emulsion system with the aid of a free-radical generating catalyst by well-known methods. More specifically, the terpolymers of the invention can be prepared by feeding a mixture of compressed gases containing TFE, HFP and $VF_2$ to a mechanically stirred autoclave maintained at an elevated temperature (e.g., 40° to 140° C.) and pressure (e.g., 1.4 to 14 MPa), and simultaneously feeding water, catalyst and any other reactants to the autoclave. The procedure is described in some detail in U.S. Pat. No. 2,968,649 and U.S. Pat. No. 4,123,603 which deal with compositions having elastomeric properties. Since the polymers of this invention are somewhat more plastic with less tendency to mass, they can be isolated from the polymerization latex by simpler procedures, e.g., filtration, washing and drying, than those described for the elastomeric polymers. If it is desired to use an aqueous latex to apply the coating to the base film, a suitable material can be prepared by creaming and stabilizing the polymerization product latex by known methods, for example those described in U.S. Pat. No. 3,962,169.

The terpolymers of the invention can be used as a heat-sealable coating on various polymer films such as those of aromatic polyimides, polyamides, polyamideimides, polyparabanic acids, and others. The coatings can be applied to the base layer of film by either solvent coating or dispersion coating.

For solvent coating, solutions in solvents such a tetrahydrofuran, methyl ethyl ketone, and acetone, and mixtures thereof, can be used.

For dispersion coating, an aqueous polymer dispersion (also termed a latex) prepared during synthesis of the terpolymer can be modified for use by creaming and stabilizing, as noted above. Dispersions containing 50 to 80% by weight solids can be used. After application of the dispersion to the base film, the water is removed by evaporation.

For use as a coating on film, the terpolymer should have a molecular weight high enough to be film forming. For this purpose, an inherent viscosity of at least 0.1 dl/g, measured at 30° C. on a solution of 0.1 g of polymer in 100 ml of a mixture of 86 weight % tetrahydrofuran and 14 weight % dimethylformamide, is adequate, and an inherent viscosity of 0.2 to 0.6 dl/g is preferred. Terpolymers having an inherent viscosity as high as about 1.5 dl/g have been used to make heat-sealable coated film.

The coated film so prepared possesses advantageous properties not expected from what is known in the art. It can be heat sealed at temperatures in the range of 200° to 350° C. Temperatures of 350° C. and lower for short dwell times do not unduly damage tin-coated copper conductors and thus do not impair the solderability thereof, while the higher temperatures of 400° C. and greater required to heat-seal PTFE and FEP polymers result in damage to tin-coated copper conductors.

Heat-seal strengths of 1000–3000 g/2.54 cm (400–1200 g/cm) for coated-side-to-coated-side (C/C) seals, and of 500–2200 g/2.54 cm (200–880 g/cm) and generally in excess of 1500 g/2.54 cm (600 g/cm) for coated-side-to-uncoated-side (C/U) seals, are readily attained.

Heat seals of the coated film are thermally durable, i.e., they remain strong, and have often even improved in strength, after aging at a temperature of 180° C. for periods up to 1000 hours. The heat-seals remain strong, and sometimes have even improved when placed in boiling water for periods up to 6 hours. Further, in preferred coatings, the heat-seals remain strong even after immersion for 18 hours in Brulin 715N or Brulin 1-4-77N, high pH detergent solutions, or in Skydrol LD, a phosphate ester hydraulic fluid, all used extensively in the aerospace industry; in many nonaerospace uses, however, resistance to attack by such materials is not important.

It is desirable and preferred that C/C seals be at least 1600 g/2.54 cm and maintain at least that value in the several tests just described, and that C/U seals be at least 800 g/2.54 cm and maintain at least that value in the same tests.

The coated film, when formulated to contain a particulate material in the coating, as described hereinabove, has antiblocking characteristics when tested at 52° C.

To further illustrate the innovative aspects of the present invention, the following examples are provided.

EXAMPLE 1

A two-liter, mechanically stirred autoclave was controlled at a temperature of 105° C. and a pressure of 6.3 MPa and the following feed streams were introduced:
(a) three liters per hour of water containing 4.7 g/l ammonium persulfate and 0.83 g/l sodium hydroxide;
(b) three liters per hour of water containing 1.6 g/l ammonium perfluorooctanoate and 3.2 g/l isopropyl alcohol;
(c) 1806 g/hr of a compressed gaseous monomer mixture of 42% tetrafluoroethylene, 29 weight % vinylidene fluoride and 29 weight % hexafluoropropene.

After several turnovers of reactor contents, the liquid effluent from the reactor was collected and treated with a solution of potassium aluminum sulfate. The polymer separated as a fine powder which was removed by filtration, washed repeatedly with water and dried in a circulating air oven.

The composition of the product was calculated from the difference between the measured amounts of the gaseous feed (stream c above) and the amount and composition of the unreacted gases which were collected and analyzed by gas chromatography (174 g/hr of a mixture containing 6.5 weight % TFE, 1.7 weight % $VF_2$ and 91.8 weight % HFP). The composition of the product was 46 weight % TFE, 32 weight % $VF_2$ and 22 weight % HFP. The polymer had an inherent viscosity of 0.26 dl/g (0.1 g/100 ml of a mixture of 86 weight % tetrahydrofuran and 14 weight % dimethyl formamide at 30° C.), a Mooney viscosity ($M_L = 10/100°$) of 43 and a glass transition temperature ($T_g$) of $-1°$ C. along with a broad melting range of 50°–140° C. when examined by DSC (differential scanning calorimetry).

EXAMPLE 2

A polymerization was conducted as in Example 1, except that the temperature was maintained at 110° C., stream (a) was 8 liters per hour of water containing 1.39 g/l ammonium persulfate and 0.3 g/l sodium hydroxide, stream (b) was omitted and the compressed gas mixture of 41 wt % TFE, 45 wt % VF$_2$ and 14 wt % HFP was fed at the rate of 2050 g/hr (stream c). The product polymer composition calculated from the feed and unreacted gas streams was 43 wt % TFE, 47 wt % VF$_2$ and 10 wt % HFP. The polymer product had a T$_g$ of −4° C. and a melting range (DSC) of 110°-130° C.

EXAMPLE 3

A polymerization was conducted as in Example 2, except that stream (a) contained 1.30 g/l ammonium persulfate and 0.37 g/l sodium hydroxide, and stream (c) was 2000 g/hr of a mixture of 24 wt % TFE, 63 wt % VF$_2$ and 13 wt % HFP. The product composition was calculated to be 26 wt % TFE, 64 wt % VF$_2$ and 10 wt % HFP. The product had an inherent viscosity of 1.46 dl/g, a T$_g$ of −28° C. and a melting range (by DSC) of 20°-95° C.

EXAMPLE 4

A polymerization was run as in Example 3, except that stream (a) contained 1.34 g/l ammonium persulfate and 2.64 g/l of diethyl malonate and stream (c) was a mixture of 14 wt % TFE, 76 wt % VF$_2$ and 10 wt % HFP. The product composition was calculated to be 15 wt % TFE, 76 wt % VF$_2$ and 9 wt % HFP. The product had an inherent viscosity of 0.55 dl/g, a Tg of −40° C. and a melting range of 50°-125° C.

EXAMPLE 5

An 18.5% by weight solution in tetrahydrofuran (THF) of a terpolymer having 46:32:22% by weight of TFE:HFP:VF$_2$ polymerized units containing 1% by weight (based on terpolymer) of finely divided silica dispersed therein was prepared from 10 g of terpolymer, 50 cc of THF and 0.1 g of silica.

A base layer of heat-set film of poly-meta-phenylene isophthalamide, 25 micrometers thick, having a Tg (glass transition temperature) of 272° C., was taped to a glass plate. The base layer was coated with the above terpolymer solution with the aid of a doctor knife having a 51 micrometer (2 mil) clearance. The coated film was allowed to stand in air at room temperature to permit THF to evaporate, and then drying was completed in an oven at 160° C. for 5 minutes. The coated film was heat-sealed at 300° C./138 kPa/20 sec. Heat-seal values were measured immediately and after aging at 180° C. for various times, coated-side-to-coated-side (C/C) and coated-side-to-uncoated-side (C/U), as follows:

|  | Heat-seals | |
|---|---|---|
|  | C/C (g/2.54 cm) | C/U (g/2.54 cm) |
| Immediate | 883 | 400 |
| Aged at 180° C., 250 hrs | 2467 | 1133 |
| 500 hrs | 2533 | 650 |
| 1000 hrs | 3000+ | 1467 |

The heat-seal strengths are peel strengths measured on fin seals 2.54 cm (1 inch) wide with a Suter tester.

A wire bend test was carried out as follows. A metal wire of diameter 1.024 mm (AWG wire gauge 18) was wound for 15-20 cm (6-8 inches) of its length with a strip of the film 9.5 mm (⅜ inch) wide, with the coated side of the film wound toward the outside, the film strip being tightly wound on the wire with an overlap of about 50% and a wrap angle of about 45°, the two ends of the film strip being secured with small pieces of a pressure sensitive tape ("masking tape"). The portion of wire insulated with film was then immersed for 30 seconds in a bath of molten solder (50:50 tin:lead) maintained at 300° C. to heat seal the film wrap, removed from the bath, and permitted to cool and cleaned of any adherent solder. The insulated portion of wire was then bent back on itself so as to form 4 to 6 tight spiral loops around its own circumference, and the film insulation on the loops was examined for any breaks. The presence of one or more breaks in the film is rated as a failure, and no breaks in the film is a pass. As no breaks were found in the sealed film insulation, the insulated wire passed the test.

EXAMPLE 6

To 100 g of an aqueous dispersion of the terpolymer of EXAMPLE 5 having a solids content of about 70% by weight was added 1.5 g of Epon Curing Agent H-2 (a blocked diamine of unknown constitution supplied under that trade name by Shell Chemical Co.) and the mixture was thoroughly stirred. The resulting dispersion was coated onto a base film of poly-bis(4-aminophenyl)ether pyromellitimide (Tg above 380° C.), 25 micrometers thick, using a doctor knife with a 51 micrometer clearance. The coating was coalesced at 70° C., then dried in an oven at 200° C. for 45 minutes. Samples were heat-sealed at 300° C./138 kPa/20 sec., with results as follows:

| Heat-seals | |
|---|---|
| C/C (g/2.54 cm) | C/U (g/2.54 cm) |
| 3000 | 1600 |

INDUSTRIAL APPLICABILITY

An important use for the terpolymers of the invention is as a heat-sealable coating for films of aromatic polymers. The resulting coated film is useful as wire insulation, and is a technically advanced film as it provides strong and durable heat-seals, even for C/U heat seals in the case of one-side-coated film. The coatings can be formulated to be nonblocking in the case of one-side-coated film, and for the more preferred compositions even in the case of two-side-coated film. The temperature required for heat-sealing the film of the invention is substantially lower than that for known thermally stable fluoropolymer coatings, and thus the film can be used in conjunction with tin-coated copper conductors and sealed without impairing the solderability of such conductor. Other uses for the terpolymers of the invention include O-rings, gaskets, seals, extruded wire insulation, and oil-well packers.

I claim:

1. A terpolymer consisting of 12 to 48% by weight of polymerized tetrafluoroethylene units, 7 to 24% by weight of polymerized hexafluoropropylene units and 30 to 81% by weight of polymerized vinylidene fluoride units, provided that when the content of tetrafluoroethylene units is less than 42% by weight, the content of hexafluoropropylene units is less than 13% by weight.

2. The terpolymer of claim 1 consisting of 44 to 48% by weight tetrafluoroethylene units, 20 to 24% by weight hexafluoropropylene units and 30 to 34% by weight vinylidene fluoride units.

3. The terpolymer of claim 1 consisting of 12 to 48% by weight tetrafluoroethylene units, 7 to 13% by weight hexafluoropropylene units and 39 to 81% by weight vinylidene fluoride units.

* * * * *